(12) United States Patent
Ito et al.

(10) Patent No.: US 6,664,510 B2
(45) Date of Patent: Dec. 16, 2003

(54) PLATING-FREE SOLID WIRE FOR MAG WELDING

(75) Inventors: Takaaki Ito, Fujisawa (JP); Hiroyuki Shimizu, Fujisawa (JP); Yasuyuki Yokota, Fujisawa (JP); Tsuyoshi Kurokawa, Fujisawa (JP); Fusaki Koshiishi, Fujisawa (JP)

(73) Assignee: Kabushiki Kaisha Kobe Seiko Sho, Kobe (JP)

( * ) Notice: Subject to any disclaimer, the term of this patent is extended or adjusted under 35 U.S.C. 154(b) by 0 days.

(21) Appl. No.: 10/225,197

(22) Filed: Aug. 22, 2002

(65) Prior Publication Data

US 2003/0085211 A1 May 8, 2003

(30) Foreign Application Priority Data

Aug. 23, 2001 (JP) .................................. 2001-252526
Apr. 23, 2002 (JP) .................................. 2002-121436

(51) Int. Cl.[7] ............................................. B23K 35/02
(52) U.S. Cl. ......................................... 219/145.1
(58) Field of Search ...................... 219/145.1, 146.1; 72/41, 42, 43, 44

(56) References Cited

U.S. PATENT DOCUMENTS 4,972,047 A * 11/1990 Puddle et al. ............... 219/118
6,054,675 A 4/2000 Kurokawa et al.
6,079,243 A * 6/2000 Inoue et al. ................... 72/41

FOREIGN PATENT DOCUMENTS

| EP | 0 904 888 A1 | 3/1999 | |
|---|---|---|---|
| JP | 5-21674 | 3/1993 | |
| JP | 8-157858 | 6/1996 | |
| JP | 10-185669 | 6/1998 | |
| JP | 10-272596 | * 10/1998 | ........... B23K/35/40 |

* cited by examiner

Primary Examiner—M. Alexandra Elve
(74) Attorney, Agent, or Firm—Oblon, Spivak, McClelland, Maier & Neustadt, P.C.

(57) ABSTRACT

A plating-free solid wire for arc welding has pits opening on its circumference, and wider inside than at each opening, and/or pits having a portion non-irradiated with an externally incoming light. A sulfide and a polyisobutene-containing oil are present in the pits and/or on the wire surface, the latter being present in an amount of 0.1–2 g/10 kg of wire. Twenty or more pits are present in total per and along wire circumference. The effective pit length ratio is 0.5% inclusive-50% exclusive. 0.1–2 g of the oil is present per 10 kg of wire. 0.01–0.5 g/10 kg of 0.1–10-$\mu$m-particle-dia $MoS_2$ is present in "bottleneck-like and/or cave-like pits", on the wire surface or immediately under the wire surface. A 2–10 mass ppm/total wire mass of K compound in K is present in the pits and/or on the wire surface. These ensure good feedability and lubricating properties, and less spatters.

9 Claims, 4 Drawing Sheets

PLATING-FREE SOLID WIRE FOR MAG WELDING

BACKGROUND OF THE INVENTION

1. Field of the Invention

The present invention relates to a plating-free solid wire for MAG welding, not subjected to a plating treatment such as copper plating. More particularly, it relates to a plating-free solid wire for MAG welding, capable of extremely reducing the amount of spatters to be generated in semiautomatic welding or automatic welding.

2. Description of the Background

In general, the term "MAG welding" denotes the welding using 100% $CO_2$ as a shielding gas, or the welding using such a predominantly Ar-based mixed gas as to contain an oxidizing gas such as a $CO_2$ or $O_2$ gas in an amount of 10 to 30%. As the cause of a large difference in amount of generated spatters according to the shielding gas, mention may be made of a variation in transfer mode of droplets. For the $CO_2$ welding, the principal transfer mode is globular transfer. In contrast, for the predominantly Ar-based mixed gas welding, the principal transfer mode is spray transfer. Therefore, the amount of generated spatters is largely reduced, and excellent characteristics can be obtained also in terms of arc stability. Further, by allowing a K compound which is an alkali metal to be present on the wire surface as an arc stabilizer, it is also possible to still further stabilize the arc. The following reason may be mentioned as to why the alkali metal contributes to the stabilization of arc. Namely, the gradient of arc potential lowers to facilitate creeping-up of the arc to above the droplets. As for such an effect due to the alkali metal, the technology typified by Japanese Patent No. 1881911, or the like has already been reported.

Whereas, for polyisobutene, JP-A No.157858/1996 discloses a technology in which fats and oils sulfurized by a sulfurizing agent prevent the abrasion of a feeding chip. On the other hand, JP-A No. 158669/1998 discloses a technology in which use of polyisobutene as a viscosity index improver prevents the abrasion of a feeding chip.

Therefore, in accordance with an extension of prior art, the presence of a proper amount of K compound or oil on the wire surface is considered optimum for a further quality improvement in MAG welding, regardless of the presence or absence of copper plating.

Prior-art solid wires for MAG welding are mostly copper-plated wires. The reason why copper is plated is to ensure electric conductivity, to improve the rust resistance, and the like. However, it has been revealed that a copper-plated steel wire provides a larger surface tension of a droplet because of the higher copper concentration of the droplet surface as compared with a wire whose steel base is completely exposed, i.e., a non-copper-plated wire. The present inventors have observed an arc phenomenon in MAG welding using a high-speed video camera capable of taking 2000 frames per second. As a result, it has been shown that the droplets of the copper-plated wire transfer in the following mode. Each droplet tends to increase in diameter along the vertical direction, so that a reduction in diameter of the droplet is not achieved. This is presumably due to the following fact. Namely, there occurs a phenomenon wherein the increase in diameter of each droplet causes an instantaneous short-circuit between droplets or between droplets and molten pool during spray arc, which facilitates the spatter generation. In contrast, droplets of the non-copper-plated wire transfer in the following mode. Namely, no copper is present on the droplet surface, and hence the surface tension of the droplet is reduced, resulting in a reduction in diameter of the droplet. Accordingly, an instantaneous short-circuit will not occur between droplets or between droplets and molten pool during spray arc, resulting in a reduced amount of generated spatters. The wire on the surface of which a K compound and $MoS_2$ are allowed to be present for further reducing the amount of spatters to be generated under the condition of such a non-copper-plated wire surface, is disclosed in JP-A No. 104883/1999.

However, in actual welding wherein a wire should be fed in units of several hundred kilograms with stability, only by applying the K compound and $MoS_2$ on the plating-free wire surface, the following problem has become obvious. Namely, the K compound and $MoS_2$ drop off from the wire surface, and accumulate in a conduit liner. Accordingly, the wire feedability gradually becomes unstable.

Namely, no matter how hard the arc stabilization and a still lower spatter level due to the K compound and $MoS_2$ are pursued, it is not possible to sufficiently obtain these effects under the conditions where the wire feedability during welding is unstable.

SUMMARY OF THE INVENTION

The present invention has been completed in view of such circumstances. It is therefore an object of the present invention to provide a plating-free solid wire for MAG welding, which is capable of reducing the amount of spatters to be generated while maintaining excellent lubricating properties and feedability even during large-volume feeding.

In one aspect, we provide a plating-free solid wire for arc welding that includes: pits each having an opening on the circumferential surface of the wire, and being wider inside than at the opening, and/or pits each having a portion not to be irradiated with an externally incoming light; and a sulfide and an oil containing polyisobutene present in the inside of each of the pits and/or on the wire surface, the oil containing polyisobutene being present in an amount of 0.1 to 2 g per 10 kg of wire.

Incidentally, in this specification, the "pits each having an opening on the circumferential surface of the wire, and being wider inside than at the opening" are referred to as "bottleneck-like pits". Whereas, the "pits each having an opening on the circumferential surface of the wire, and having a partial inside not to be irradiated with an externally incoming light" are referred to as "cave-like pits".

Figure 1:
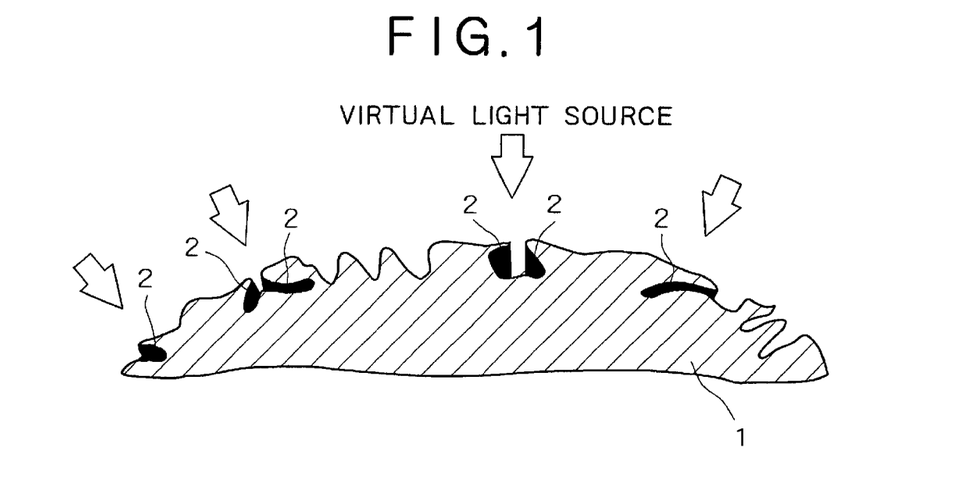
FIG. 1 is a cross sectional view schematically showing "bottleneck-like and/or cave-like pits" formed on the wire surface and/or immediately under the surface (surface layer)

FIG. 1 is a cross sectional view of a wire, showing the "bottleneck-like and/or cave-like pits". As shown in FIG. 1, the wire is characterized by having a portion which is shadowed and cannot be seen from the surface (the portion filled in with black in FIG. 1), when it is assumed that there is a virtual light source whereby light rays are projected onto the wire surface along the radial direction toward the center.

In another aspect, we provide the plating-free solid wire for arc welding wherein: the pits are preferably present one at each of not less than 20 spots in total per circumference length along a given wire circumference.

In another aspect, we provide the plating-free solid wire for MAG welding wherein: the effective length ratio of the pits is preferably not less than 0.5% and less than 50%.

In another aspect, we provide the plating-free solid wire for arc welding wherein: the oil containing polyisobutene is preferably present in an amount of 0.1 to 2 g per 10 kg of wire.

In another aspect, we provide the plating-free solid wire for MAG welding wherein: $MoS_2$ having a particle diameter of 0.1 to 10 μm is present as the sulfide in the "bottleneck-like and/or cave-like pits", i.e., on the wire surface or immediately under the wire surface, and the coating weight of the $MoS_2$ is 0.01 to 0.5 g/10 kg.

In another aspect, we provide the plating-free solid wire for arc welding wherein: a K compound is present in the pits and/or on the wire surface, and is present herein in an amount in terms of K of 2 to 10 mass ppm based on the total mass of the wire.

In another aspect, we provide the plating-free solid wire for arc welding wherein: the K compound is preferably potassium borate.

In another aspect, we provide the plating-free solid wire for arc welding wherein: $MoS_2$ having a particle diameter of 0.1 to 10 μm is preferably present in the pits and/or on the wire surface in an amount of 0.01 to 0.5 g per 10 kg of the wire.

In another aspect, we provide the plating-free solid wire for arc welding wherein: as the wire components, the wire preferably contains: C: 0.01 to 0.15 mass %, Si: 0.2 to 1.2 mass %, Mn: 0.5 to 2.5 mass %, P: 0.001 to 0.030 mass %, S: 0.001 to 0.030 mass %, and O: 0.001 to 0.020 mass %.

In another aspect, we provide the plating-free solid wire for arc welding wherein: the wire may contain Cu in an amount of not more than 0.05 mass %.

In another aspect, we provide the plating-free solid wire for arc welding wherein: the wire may contain Ti+Zr in an amount of 0.03 to 0.3 mass %.

In another aspect, we provide the plating-free solid wire for arc welding wherein: the wire may contain Mo in an amount of 0.01 to 0.6 mass %.

In the present invention, with such a configuration, even at the time point when the wire during welding has been fed to immediately above the chip, the lubricating properties are sufficiently kept. Accordingly, it becomes possible to implement a further stabilization of the arc and a further reduction in amount of generated spatters while holding the perfect feedability.

Figure 2:
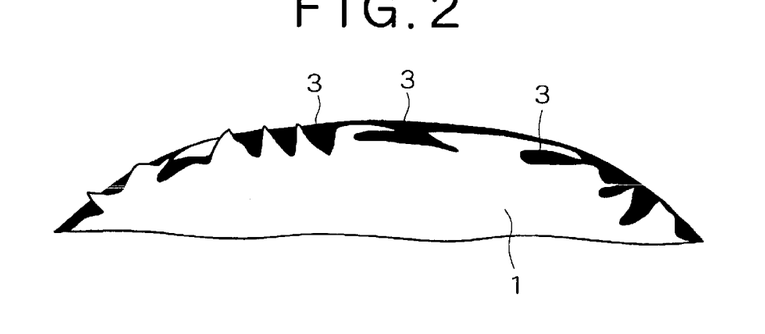
FIG. 2 is a cross sectional view schematically showing the state in which functional materials exist in the wire surface portion.

Further, the state where the K compound and $MoS_2$ are present in the "bottleneck-like and/or cave-like pits", i.e., on the surface and/or immediately under the surface of the wire, and the state where an oil containing polyisobutene is present on the wire surface denote the following state. Namely, as schematically shown in FIG. 2, these functional materials are deposited as a thin film so as to coat the wire surface, or these functional materials are present in a large number of pits formed in the wire surface. These functional materials denote all of the K compound, $MoS_2$, and the oil containing polyisobutene which will be taken out when the wire surface portion to a depth of 30 μm from the wire surface is removed after acid pickling of the wire surface with a hydrochloric acid (HCl).

Other and further objects, features and advantages of the invention will appear more fully from the following description.

BRIEF DESCRIPTION OF DRAWINGS

FIGS. 3A and 3B are diagrams each showing the mode in which droplets at the wire tip transfer during wire welding, wherein

FIGS. 4A and 4B are diagrams each showing the actual shapes of the "bottleneck-like and/or cave-like pits" formed on the surface of a wire of Example, wherein

DETAILED DESCRIPTION OF THE PREFERRED EMBODIMENTS

Figure 3A:
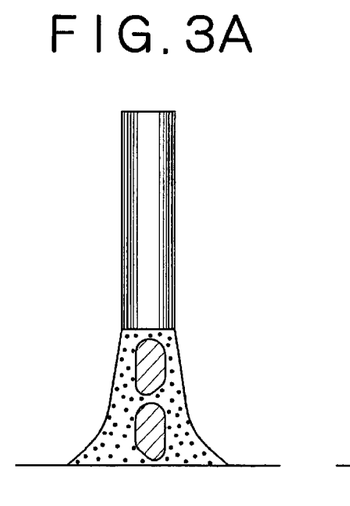
FIG. 3A is a schematic diagram showing the transfer mode of droplets from a copper-plated wire.

Below, the present invention will be described in detail by way of examples. When the wire has been copper plated, as shown in FIG. 3A, the copper-plated layer of the wire surface has an effect of holding electric conductivity, but each droplet tends to be vertically elongated. The vertically elongated droplet facilitates the induction of an instantaneous short circuit. Further, the droplet also becomes more likely to fluctuate.

Figure 3B:
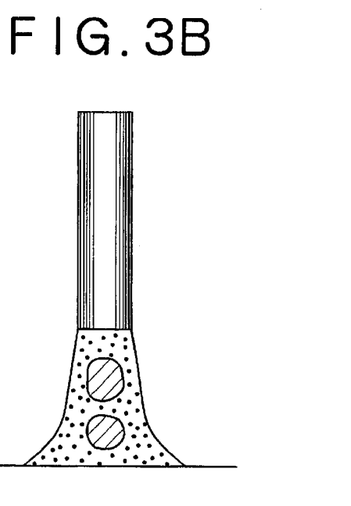
FIG. 3B is a schematic diagram showing the transfer mode of droplets from a non-copper-plated wire.

On the other hand, as shown in FIG. 3B, for the non-copper-plated wire, each droplet becomes more likely to be released than in the copper-plated wire, and the droplet becomes smaller, and has a shape closer to a sphere. As a result, the instantaneous short circuit also becomes less likely to occur.

Further, if an arc stabilizer containing a K compound which is an alkali metal is present on the surface, or in the vicinity of the surface of the wire, the electron emission from the base material becomes easy. Therefore, the gradient of arc potential lowers to facilitate the creeping-up of the arc. Accordingly, a still further reduction in size of the droplet becomes possible. As a result, the amount of spatters generated due to a short circuit, or the like is also remarkably reduced.

In the present invention, K borate is desirably used as the arc stabilizer containing a K compound. The K borate is readily commercially available in fine particle size. By coexistence with polyisobutene as a viscosity modifier, the K borate becomes less likely to fall off from the wire surface. On the other hand, for an organic K compound having a long carbon chain such as K stearate to be used as a wire drawing lubricant, or the like, even if the K compound coexists with polyisobutene, the susceptibility to falling will not be changed.

Further, by allowing a proper amount of $MoS_2$ to be present on the surface or in the vicinity of the surface of the wire, the feed resistance is reduced to further accelerate the reduction in size and the enhancement of releasability of each droplet. Polyisobutene is optimum as an oil for effectively retaining fine particles of $MoS_2$ on the wire surface.

Below, examples of a method for carrying out the present invention will be described specifically by reference to the accompanying drawings. In the present invention, as shown in FIG. 2, functional materials 3 are present in the surface portion of a wire 1. The functional materials 3 may be a material containing K as an arc stabilizer (ex., K borate), or the K-containing material and MoS$_2$ having a particle diameter of 0.1 to 10 μm. They are present in the "bottleneck-like and/or cave-like pits", i.e.,on the surface and/or immediately under the surface of the wire. Further, out of the functional materials 3, the ones present on the surface of the wire 1 include an oil containing polyisobutene.

Then, a description will be given to one example of a method for forming the "bottleneck-like and/or cave-like pits" on the wire surface. Incidentally, such "bottleneck-like and/or cave-like pits" may not be previously formed in the wire prior to wire drawing, but may also be formed at the intermediate stage of wire drawing, or may also be formed at the final stage. The method based on the following three steps is an effective manufacturing method incurring a low manufacturing cost from the industrial viewpoint.

1. Step of Forming Roughness in the Step of Processing a Wire Blank

The "raw wire" which is the wire blank of a welding wire is manufactured by uniform continuous casting and hot rolling steps in an ironwork. However, it may also be manufactured by being cast in a batch-type furnace, followed by rolling. By adjusting the rolling conditions at this step, i.e., the rolling temperature and the reduction, it is possible to form "wrinkle-like pits" along the longitudinal direction of the wire. Although each of the "wrinkle-like pits" is generally filled with iron oxide (so-called scale), it can become a "pit in the wire blank" which can be changed into the "bottleneck-like and/or cave-like pit" through the steps described below by mechanically and chemically removing the iron oxide. Therefore, the rolling temperature and the reduction are adjusted so as to obtain "pits in the wire blank" previously having a sufficient depth.

Alternatively, it is also possible to control the roughness on the wire blank by annealing. For example, first, a wire blank is annealed in an oxidizing atmosphere or a steam atmosphere, thereby to preferentially oxidize the metal crystal grain boundary. After annealing, the oxide film is chemically or electrochemically removed, so that grain boundary corrosion spots are selectively removed to form the "pits in the wire blank".

In the foregoing step of chemically removing the oxide film, it is also possible to control the degree of the "pits in the wire blank" by adjusting the acid pickling conditions. When the wire blank is pickled with a hydrochloric acid, it is also possible to control the degree of the "pits in the wire blank" by adding oxygen, and/or nitric acid, and/or oxygenated water, etc., to a hydrochloric acid bath to improve the oxidizing power. It is also possible to control the "pits in the wire blank" by using an acid other than a hydrochloric acid. For example, the raw wire surface is subjected to a passivation treatment using a nitric acid. Subsequently, by locally electrolytically etching the surface using a chlorine ion or the like, it is possible to form pits in the raw wire surface. Whereas, by selectively dissolving only the iron oxide (scale) on the wire blank surface by acid pickling using an inhibitor, and keeping the sharp pits inherent in the composition without dulling the sharpness, it is also possible to obtain the wire blank having a large number of sharp pits. The sharp pits thus obtained tend to become the "bottleneck-like and/or cave-like pits" by the method described later. Namely, with general acid pickling, in the resulting pit, the outer edge of its opening smoothly extends. In contrast, when an inhibitor is used, the outer edge of the opening of the resulting pit still extend at an acute angle, so that the pit is narrower at the outer edge of the opening than inside. It is noted that the inhibitor denotes a chemical of a steel base corrosion inhibitor.

Further, alternatively, in a wire blank processing step, by using a rolling roller whose surface roughness has been adjusted, and transferring the roughness on the roller surface to the wire surface, it is possible to form the "pits in the wire blank". The formation of the "pits in the wire blank" by roller transfer is possible irrespective of the presence or absence of an oxide film, the wire drawing temperature, and the wire diameter.

2. Step of Filling the Pits with Some Filling Matter, and then Narrowing the Opening (Frontage) while Keeping the Presence of, the Pits Onto the wire blank surface with its openings largely open, a functional coating agent which will become required at the final product wire diameter is applied. Then, the wire is wiredrawn, thereby to narrow the openings. Accordingly, a steel film is thinly coated on the coating agent in the pits. As a result, it is possible to obtain a desired "wire in which a coating agent is present in the inside of each of the bottleneck-like and cave-like pits". The wire drawing at this step can be carried out by the use of a wire drawing die, a micro mill, or a roller die.

When wire drawing is carried out using a wire drawing die, it is difficult to keep the shape of the "pit in the wire blank" as it is. However, by adjusting the binder components in the coating agent, it is possible to form the "bottleneck-like or cave-like pits". Specifically, by using borax, an inorganic binder and/or organic binder to be chemically bonded to the wire surface in a bonderizing treatment, or the like, it is possible to keep the pit shape.

Whereas, when a micro mill and/or a roller die is used, the pits in the wire blank" relatively tend to be kept. Accordingly, it is possible to form the "bottleneck-like or cave-like pits" at the final wire diameter.

In the wire drawing step, the wire may be wiredrawn not only by means of the wire drawing die, micro mill, or roller die alone, but also by a combination of these means.

Further, a K compound (particularly, K borate), MoS$_2$, or an oil containing polyisobutene is mixed with an organic and/or inorganic binder. The resulting mixture is applied onto the wire surface. Then, the wire is subjected to the foregoing wire drawing step, thereby to gradually narrow the opening (frontage) of the wire surface while keeping the shape of each of the "pits in the wire blank". As a result, it is possible to form the "bottleneck-like or cave-like pits" capable of retaining a K compound, MoS$_2$, or the oil containing polyisobutene with high efficiency.

3. Step of Finishing the Wire so that the Resulting Wire Apparently has the Smooth Surface Finally, a functional material such as a feed lubricant, an electric conductivity stabilizer, or a spatter inhibitor is required to be filled in the pits. In addition, the wire is required to be finished so as to have an apparently smooth surface in order to ensure good electric conductivity and clogging resistance.

At the final wire diameter, when the functional material has been filled at the stage of forming the "pits in the wire blank", the wire is subjected to a skin pass processing (a processing at a low reduction) by means of a finishing wire drawing die, a roller die, or the like. Accordingly, a wire steel film is thinly coated on the opening of each of the pits, so that the frontage thereof becomes smaller. In consequence, it is possible to manufacture the wire of the present invention.

Still further, alternatively, the "pits in the wire blank" are previously filled with another material, followed by wire drawing. At a finishing wire drawing step, not less than one selected from the group consisting of a K compound, MoS$_2$, and an oil containing polyisobutene are dispersed in water, alcohol, oil, emulsion, or the like, and the resulting dispersion is rubbed into the wire surface. Also by doing so, the materials displace the material previously charged in the inside of each of the "bottleneck-like or cave-like pits", and remain in the pits.

Figure 4A:
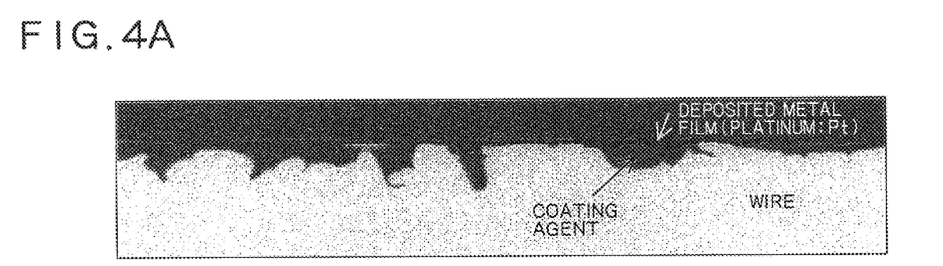
FIG. 4A is a micrograph taken after depositing a platinum film on the wire surface, and polishing the wire cross section.
Figure 4B:
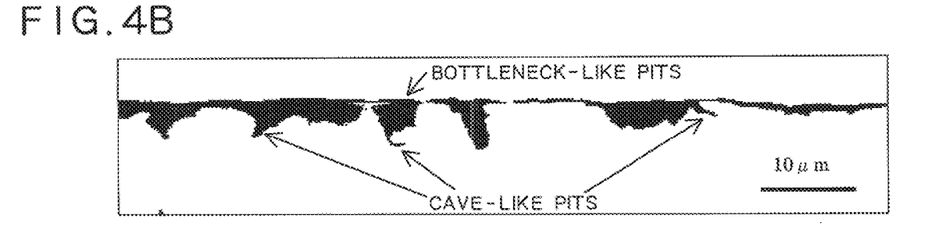
FIG. 4B is a photograph obtained by burning the micrograph into photographic paper, and subjecting the image to an image capturing processing as digital data.

FIG. 4 is a photograph showing the cross section of an actual wire of the present invention. It is noted that the wire of the present invention is strictly a non-copper-plated solid wire. This is due to the following fact. Namely, for a copper-plated wire, even if the foregoing "bottleneck-like or cave-like pits" are formed therein, the copper plating becomes more likely to peel off. Therefore, it is not possible to put the wire into practical use. Simultaneously, as described previously, the unstable phenomenon in droplet transfer due to the copper plating tends to occur.

Then, the characteristics of the "bottleneck-like and/or cave-like pits" will be described in more details. The evaluation of the characteristics of the wire having such "bottleneck-like and/or cave-like pits" has revealed the following facts.

As for the number of the "bottleneck-like and/or cave-like pits", the pits are preferably present one at each of not less than 20 spots in total per circumference length along the circumference of the wire. As a result, it is possible to retain the functional materials enough for sufficiently exerting the effect of the coating agent. The number of the pits is calculated in the following manner. First, the wire is sampled in a length of 1 m, and the cross sections are taken one at each of 10 spots along the longitudinal direction. Then, the number of pits 0.5 (per circumference) along the circumference of the wire is counted, and the maximum value of the 10 cross sections is defined as the total number of the pits. Namely, it suffices that even one cross section out of the 10 cross sections has not less than 20 pits.

If the number of the pits each in such a shape is not less than 20 per circumference, it is possible to retain the coating agent in an amount enough for sufficiently producing its effects on the feedability, the arc stability, and the reduction in amount of generated spatters. In addition, it is possible to prevent the coating agent from being unevenly distributed in only a part along the circumference of the wire. If the number, of the pits is less than 20, the positions may be unevenly distributed to a part along the circumference of the wire. In this case, the coating agent will act on only a part of the wire circumferential surface, so that it becomes difficult to obtain a uniform and stable arc phenomenon.

Further, if the length ratio of the effective pits is not less than 0.5% and less than 50%, the effect of retaining the coating agent is further enhanced, and the effects of the coating agent are sufficiently exerted. Incidentally, the length ratio of the effective pits is defined as the ratio of the total sum $l_1+l_2+\ldots+l_n$ of the lengths of the portions which will be shadowed when a light is virtually projected vertically to the wire surface to the wire reference circular arc length l. This can be expressed mathematically as the following mathematical expression 1:

$$\frac{l_1 + l_2 + \cdots l_n}{l} \times 100 \qquad \text{[Expression 1]}$$

Whereas, when the length ratio of the effective pits is not less than 0.5% and less than 50%, the effect of retaining the coating agent is sufficiently exerted. If the length ratio of the effective pits is less than 0.5%, it is not possible to retain a sufficient amount of the coating agent. Conversely, if the length ratio of the effective pits is not less than 50%, the surface roughness increases, resulting in an increase in frictional resistance of the surface. Accordingly, the feedability of the wire is degraded.

Generally, the size of roughness on the surface of a wire, or the like is expressed using the average roughness Ra, the maximum height Ry, the ten point average roughness Rz, the load length ratio tp, the average spacing between roughness elements Sm, and the average spacing between local peaks S, the specific surface area, and the like. However, it cannot be said that the coating agent can be effectively retained only by the simple roughness expressed by these values. Namely, only by the simple roughness as studied in prior art, if the wire undergoes distortion, the shape of each pit is also changed. Accordingly, the coating agent becomes more likely to be released therefrom. In order to effectively retain the coating agent, it is desirable to retain the coating agent in the "bottleneck-like and/or cave-like pits" each having an anchor effect. This eliminates the possibility that the coating agent is readily released from the pits even if distortion of the wire, or the like occurs to change the shape of each pit to a certain degree.

The shape of each pit can be checked with the following method. First, a metal thin film of Pt, Ni, or Cu is evaporated onto the wire surface by sputtering. Subsequently, the wire is embedded in a thermosetting resin. Then, the cross section is polished. The polished cross section is then observed under a scanning electron microscope to check the wire surface geometry, and the presence or absence of the coating agent. The pit length ratio of the bottleneck-like and cave-like pits is preferably determined by observing the surface of the wire cross section at a magnification of 1000 times to 2000 times. More specifically, the image of the surface is printed at a magnification of 1000 times to 2000 times, or the image is captured as digital data. For the photographic paper, the total sum of lengths of shadows with respect to a virtual light source is determined using a divider. The value is divided by the reference circular arc length of the wire. Thus, it is possible to determine the effective pit length ratio. Whereas, the digital data is subjected to an image processing to define the shape. Then, the total sum of lengths of shadows with respect to the virtual light source is determined. The value is divided by the reference circular arc length of the wire. Thus, it is possible to determine the effective pit length ratio.

The effective pit length ratio cannot be detected by the conventionally performed contact-type roughness measurement of the wire surface and non-contact type shape measurement by the use of an electron beam or a laser.

The effective pit length ratio is controlled to fall within a prescribed range in the following manner. Namely, a raw wire or a wire being drawn is subjected to high-reduction hot rolling. As a result, it is possible to obtain a wire surface having specific wrinkles unobtainable by the prior art, particularly, deep pits. In the prior art, the intentional formation of pits is avoided for the following reason. Namely, if excessive pits are formed on the wire surface at the wire blank processing step, rough surface, cracks, and the like are caused in the subsequent wire drawing step. The present invention disproves such prior art common sense.

Further, by appropriately allowing a K compound to be contained in polyisobutene, and to be present on the surface or in the vicinity of the surface of the wire, it is possible to obtain the effects of the reduction in size of the droplets and making it more difficult for an instantaneous short circuit to occur.

Further, by appropriately allowing $MoS_2$ to be contained in polyisobutene, and to be present on the surface or in the vicinity of the surface of the wire, it is possible to obtain the effect of further promoting the reduction in size of droplets.

Below, a description will be given to a method for analyzing a K compound and a method for analyzing $MoS_2$.

(Method for Analyzing a K Compound)

1. Cut samples of a K compound-deposited wire are prepared in a length of about 20 to 30 mm and in an amount of 20 g;
2. A liquid obtained by mixing a hydrochloric acid and an oxygenated water is poured into a quartz beaker. The cut samples are placed therein, and immersed for several seconds. Then, the cut samples are taken out, and the residual liquid is filtered; and
3. The concentration of the K compound in the liquid after filtration is measured by an atomic absorption method to determine the coating weight per 10 kg of wire.

(Method for Analyzing $MoS_2$)

A wire is washed with an organic solvent (ex., ethanol, acetone, petroleum ether, or the like). Then, the wash liquid is filtered through filter paper, and then the filter paper is dried. The filter paper is subjected a wet method (wet asking, wherein a filter paper and $MoS_2$ are completely dissolved and ionized so as to generate white smoke in nitric acid, sulfuric acid and perchloric acid) to dissolve $MoS_2$ (a), and Mo is quantified by an atomic absorption method. The wire after ethanol washing is immersed and dissolved in a hydrochloric acid aqueous solution (hydrochloric acid 1+water 1) to liberate $MoS_2$ (b). Then, the liberated $MoS_2$ (b) is filtered through filter paper, and then $MoS_2$ is dissolved by a wet method to quantify Mo by an atomic absorption method. Then, the total amount of (a)+(b) is determined in terms of $MoS_2$, and divided by the wire mass, thereby determining the coating weight of $MoS_2$ per 10 kg of wire.

(Polyisobutene Qualitative Analysis Method)

Figure 5:
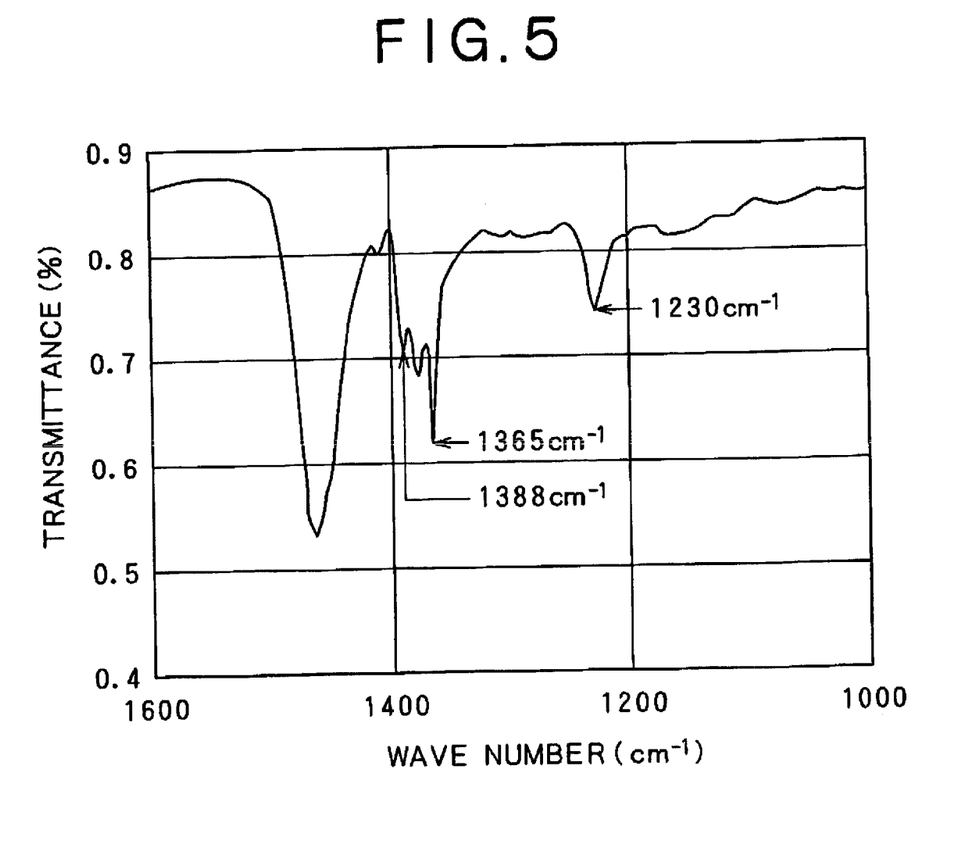
FIG. 5 is a graph showing the characteristic absorption of polyisobutene, wherein the abscissa denotes the wave number, and the ordinate denotes the transmittance.

Whether the oil on the wire surface contains polyisobutene or not can be judged in the following manner. The wire surface is washed using carbon tetrachloride or hexane as a washing solvent. The washing solvent is removed from the wash liquid by distillation under reduced water. Then, the infrared absorption spectrum of the residue is measured by a transmission method. FIG. 5 is a graph showing the characteristic absorption of polyisobutene, wherein the abscissa denotes the wave number, and the ordinate denotes the transmittance. If there is observed a characteristic absorption having maximums in the vicinity of 1230 $cm^{-1}$, 1365 $cm^{-1}$, and 1388 $cm^{-1}$, it can be judged that polyisobutene is contained therein. Polyisobutene has the structure of the following chemical formula 1. It is considered that the absorption at 1230 $cm^{-1}$ results from the skeletal vibration of the quaternary carbon atoms, and the absorptions at 1365 $cm^{-1}$ and 1388 $cm^{-1}$ result from the deformation vibration of a methyl group with a dimethyl structure. Incidentally, these wave numbers are affected by the coexisting oil, the degree of polymerization and the branched structure of polyisobutene, and the like, so that a deviation of about 5 $cm^{-1}$ may also occur.

[Chemical Formula 1]

(Oil Quantity Quantitative Analysis Method)

A carbon tetrachloride solution containing a given concentration of polyisobutene is prepared. This solution is used as a standard solution. Cut samples of a wire are prepared in a length of about 20 to 30 mm and in an amount of about 20 g. The cut samples are immersed and washed in carbon tetrachloride. The wash liquid is measured by an infrared absorption method, and compared with the standard solution to determine the polyisobutene coating weight per 10 kg of wire.

Below, a description will be given to the reason for restricting the numerical values of the composition of the wire, K compound, and $MoS_2$.

Coating weight on wire of a K compound: 2 to 10 mass ppm

If the coating weight on wire of a K compound contained in an arc stabilizer is lower than 2 mass ppm, creeping-up of the arc to above a droplet is difficult to implement. Accordingly, the effect of reducing the size of each droplet cannot be sufficiently obtained, so that spatters become more likely to occur due to a short circuit. Whereas, if the coating weight on wire of the K compound exceeds 10 mass ppm, clogging of the inside of a conduit liner is caused, resulting in a poor feeding performance. In consequence, the amount of spatters generated is increased. Therefore, the coating weight on wire of the K compound is set to be 2 to 10 mass ppm.

Coating weight of an oil containing polyisobutene: 0.1 to 2 g per 10 kg of wire

If the coating weight of an oil containing polyisobutene is less than 0.1 g per 10 kg of wire, the effect of reducing the resistance to feeding cannot be expected. Accordingly, the amount of generated spatters is increased due to the unstable feeding. Whereas, if the coating weight of the oil containing polyisobutene exceeds 2 g per 10 kg of wire, clogging tends to be caused. In consequence, similarly, spatters are generated due to the unstable feeding. Therefore, the coating weight of the oil containing polyisobutene is set to be 0.1 to 2 g per 10 kg of wire.

Coating weight of $MoS_2$ with a particle diameter of 0.1 to 10 $\mu$m: 0.1 to 0.5 g per 10 kg of wire The particle diameter of $MoS_2$ is desirably 0.1 to 10 $\mu$m. If the particle diameter of $MoS_2$ is less than 0.1 $\mu$m, slip properties do not occur. Accordingly, it is not possible to obtain good feedability. On the other hand, if the particle diameter of $MoS_2$ exceeds 10 $\mu$m, the slip properties can be obtained. However, $MoS_2$ particles tend to peel off from the wire surface, so that sufficient feedability cannot be obtained. If the coating weight of $MoS_2$ is less than 0.01 g per 10 kg of wire, the effect of reducing the resistance to feeding cannot be expected. Accordingly, the amount of generated spatters is increased due to the unstable feeding. Whereas, if the coating weight of $MoS_2$ exceeds 0.5 g per 10 kg of wire, clogging tends to be caused. In consequence, similarly, spatters are generated due to the unstable feeding. Therefore, the coating weight of $MoS_2$ with a particle diameter of 0.1 to 10 $\mu$m is preferably set to be 0.01 to 0.5 g per 10 kg of wire.

C: 0.01 to 0.15 mass %

If the amount of C to be added is less than 0.01 mass the surface tension of each droplet extremely decreases, resulting in an increase in amount of spatters generated upon the instantaneous short circuit. Whereas, if the amount of C to be added exceeds 0.15 mass %, the surface tension increases excessively, so that large-sized spatters become more likely to be generated by the repulsion force of the arc. Therefore, the amount of C to be added is, preferably set to be 0.01 to 0.15 mass %.

Si: 0.2 to 1.2 mass %

If the amount of Si to be added is less than 0.2 mass %, the surface tension of each droplet extremely decreases, resulting in an increase in amount of spatters generated upon the instantaneous short circuit. Whereas, if the amount of Si to be added exceeds 1.2 mass %, the surface tension increases excessively, so that large-sized spatters become more likely to be generated by the repulsion force of the arc. Therefore, the amount of Si to be added is preferably set to be 0.2 to 1.2 mass %.

Mn: 0.5 to 2.5 mass %

If the amount of Mn to be added is less than 0.5 mass %, the surface tension of each droplet extremely decreases, resulting in an increase in amount of spatters generated upon the instantaneous short circuit. Whereas, if the amount of Mn to be added exceeds 2.5 mass %, the surface tension increases excessively, so that large-sized spatters become more likely to be generated by the repulsion force of the arc. Therefore, the amount of Mn to be added is preferably set to be 0.5 to 2.5 mass %.

P: 0.001 to 0.030 mass %

If the amount of P to be added is less than 0.001 mass %, the surface tension excessively increases, resulting in an increase in amount of spatters. Whereas, if the amount of P to be added exceeds 0.030 mass %, the surface tension of each droplet decreases extremely, resulting in an increase in amount of spatters upon the instantaneous short circuit. Therefore, the amount of P to be added is preferably set to be 0.001 to 0.030 mass %.

S: 0.001 to 0.030 mass %

If the amount of S to be added is less than 0.001 mass %, the surface tension excessively increases, resulting in an increase in amount of spatters. Whereas, if the amount of S to be added exceeds 0.030 mass %, the surface tension of each droplet decreases extremely, resulting in an increase in amount of spatters upon the instantaneous short circuit. Therefore, the amount of S to be added is preferably set to be 0.001 to 0.030 mass O: 0.001 to 0.020 mass %

If the amount of O to be added is less than 0.001 mass %, the surface tension excessively increases, resulting in an increase in amount of spatters. Whereas, if the amount of O to be added exceeds 0.020 mass %, the surface tension of each droplet decreases extremely, which conversely increases the amount of spatters. Therefore, the amount of O to be added is preferably set to be 0.001 to 0.020 mass %.

Cu: Not more than 0.05 mass %

The addition of Cu provides the effect of improving the wire rust resistance. For this reason, Cu is preferably added. However, if the amount of Cu to be added exceeds 0.05 mass %, each droplet is not reduced in size, and becomes elongated. Accordingly, the number of occurrences of short circuit increases, resulting in an increase in amount of spatters. Therefore, when Cu is added, it is added in an amount of not more than 0.05 mass %.

Ti+Zr: 0.03 to 0.3 mass %

If the amount of Ti+Zr to be added is less than 0.03 mass %, the amount of spatters generated upon the instantaneous short circuit increases with a reduction in surface tension of each droplet. Whereas, if the amount of Ti+Zr to be added exceeds 0.3 mass %, the surface tension increases excessively, so that large-sized spatters become more likely to be generated by the repulsion force of the arc. Therefore, when Ti+Zr are added, the amount thereof is set to be 0.03 to 0.3 mass %.

Mo: 0.01 to 0.6 mass %

If the amount of Mo to be added is less than 0.01 mass %, the amount of generated spatters increases with a reduction in surface tension. In contrast, if the amount of Mo to be added exceeds 0.6 mass %, the surface tension increases excessively, so that the spatters due to the repulsion force of the arc become more likely to be generated. Therefore, when Mo is added, the amount thereof is set to be 0.01 to 0.6 mass %.

As described above, by using the applicable conditions of the present invention for the non-copper-plated wire, it is possible to obtain the following effects:

1) Droplets are reduced in size; and

2) The instantaneous short circuit becomes less likely to occur.

As a result, the transfer mode of MAG welding droplets referred to as "spray transfer" is more smoothly implemented. Thus, it is possible to obtain a sufficient effect on the reduction in amount of spatters, which is the object of the present invention.

EXAMPLES

Below, a solid wire for MAG welding within the scope of the present invention will be compared with comparative examples departing from the scope of the present invention. Then, the effects thereof will be described.

Figure 6:
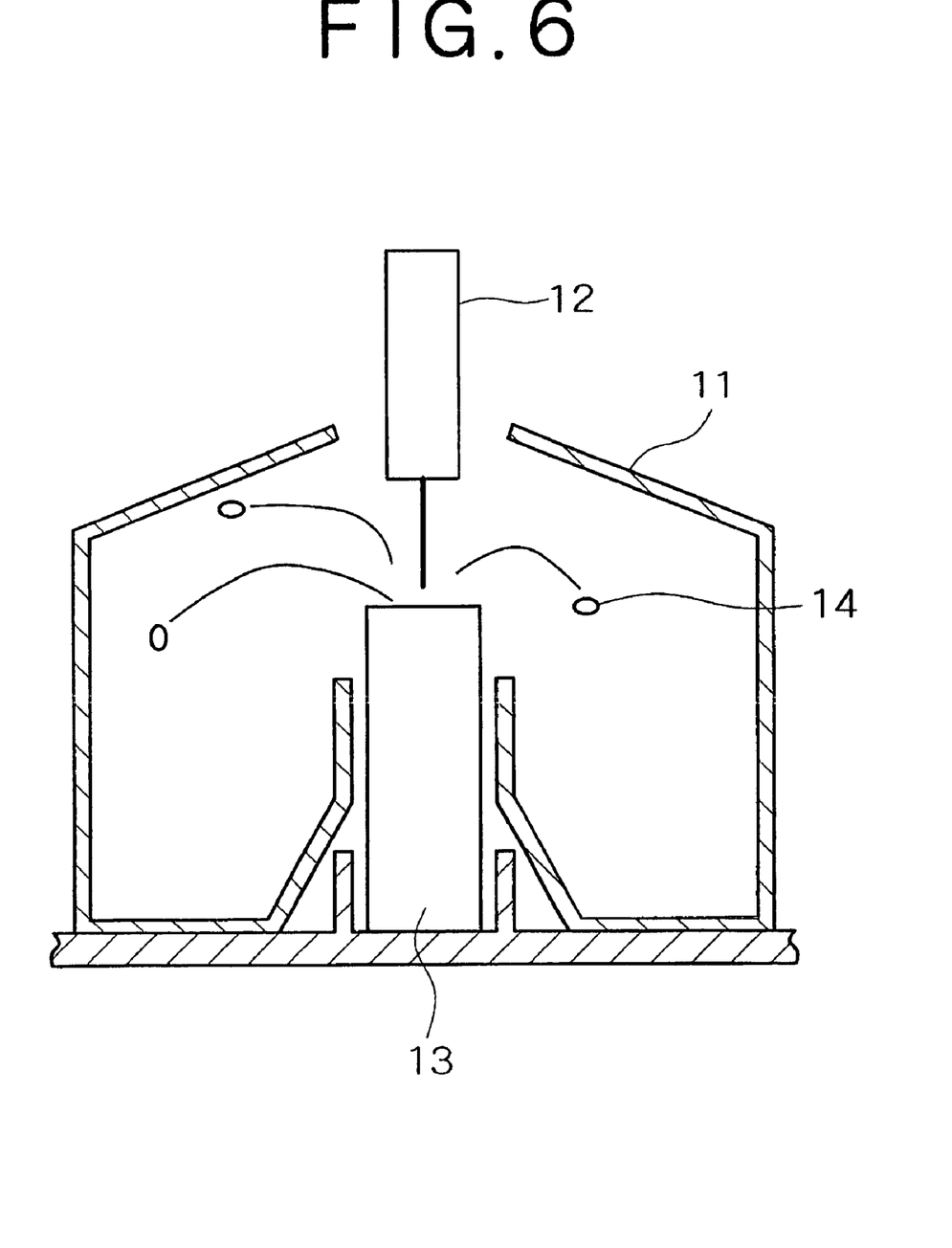
FIG. 6 is a schematic diagram showing a method for measuring spatters.

First, an experiment was carried out on the effect of reducing the amount of generated spatters of the wire to which the present invention had been applied. FIG. 6 is a schematic view showing a method for measuring spatters. A welding torch 2 was mounted top down at the top part of a collection box 1. A test sheet 3 was mounted immediately under the torch 2 in the collection box 1. Then, a welding wire was fed from the torch 2 to weld the test sheet 3 by a flat position welding process, and resulting spatters 4 were collected in the collection box 1. The spatters collected in the collection box 1 were recovered to determine the mass.

By using solid wires for MAG welding shown in Tables 1 to 3 below, the spatters were measured by means of the measuring apparatus of spatters of FIG. 6 under the welding conditions shown in Table 6 below. Incidentally, the entry of each column of "spatter evaluation" of each of Tables 1 to 3 is determined by evaluation based on the criteria shown in Table 7 below. Further, the implementation results of Table 4 are the results obtained by using the wire samples with a wire diameter of not less than 1.2 mm. However, in Table 4, the implementation results obtained by changing the wire diameter are also shown.

[Tables 1 to 7]

TABLE 1

| No. | Wire diameter (mm φ) | Wire composition (mass %) | | | | | | | | | | K (Mass PPM) | Poly-isobutene-containing oil (g/10 kg) | Number of dents | Effective pit length ratio (%) | MoS2 (g/10 kg) | Spatter evaluation |
|---|---|---|---|---|---|---|---|---|---|---|---|---|---|---|---|---|---|
|   |   | C | Si | Mn | Ti | S | O | Cu | P | Mo | Zr |   |   |   |   |   |   |
| Ex. |   |   |   |   |   |   |   |   |   |   |   |   |   |   |   |   |   |
| 1 | 1.2 | 0.132 | 0.64 | 1.40 | 0.03 | 0.012 | 0.005 | 0.005 | 0.012 | 0.05 | 0.02 | 4 | 0.15 | 30 | 2.8 | 0.20 | ○ |
| 2 | 1.2 | 0.055 | 0.88 | 1.28 | 0.05 | 0.011 | 0.005 | 0.006 | 0.015 | 0.05 | 0.01 | 5 | 0.5 | 10 | 0.2 | 0.12 | ○ |

TABLE 1-continued

| No. | Wire diameter (mm φ) | Wire composition (mass %) | | | | | | | | | | K (Mass PPM) | Poly-isobutene-containing oil (g/10 kg) | Number of dents | Effective pit length ratio (%) | MoS2 (g/10 kg) | Spatter evaluation |
|---|---|---|---|---|---|---|---|---|---|---|---|---|---|---|---|---|---|
| | | C | Si | Mn | Ti | S | O | Cu | P | Mo | Zr | | | | | | |
| 3 | 1.2 | 0.055 | 0.88 | 1.28 | 0.05 | 0.011 | 0.005 | 0.006 | 0.015 | 0.05 | 0.01 | 5 | 0.5 | 19 | 0.4 | 0.17 | ○ |
| 4 | 1.2 | 0.055 | 0.88 | 1.28 | 0.05 | 0.011 | 0.005 | 0.006 | 0.015 | 0.05 | 0.01 | 5 | 0.5 | 31 | 3 | 0.25 | ◎ |
| 5 | 1.2 | 0.055 | 0.88 | 1.28 | 0.05 | 0.011 | 0.005 | 0.006 | 0.015 | 0.05 | 0.01 | 5 | 0.5 | 65 | 47 | 0.31 | ◎ |
| 6 | 1.2 | 0.055 | 0.88 | 1.28 | 0.05 | 0.011 | 0.005 | 0.006 | 0.015 | 0.05 | 0.01 | 5 | 0.5 | 71 | 53 | 0.51 | ○ |
| 7 | 1.2 | 0.036 | 0.43 | 1.59 | 0.15 | 0.010 | 0.008 | 0.004 | 0.015 | 0.05 | 0.06 | 8 | 0.9 | 8 | 0.1 | 0.07 | ○ |
| 8 | 1.2 | 0.030 | 0.47 | 1.25 | 0.23 | 0.012 | 0.010 | 0.004 | 0.015 | 0.10 | 0.01 | 3 | 1.2 | 18 | 14 | 0.18 | ○ |
| 9 | 1.2 | 0.030 | 0.47 | 1.28 | 0.05 | 0.025 | 0.015 | 0.005 | 0.009 | 0.08 | 0.05 | 5 | 0.3 | 60 | 24 | 0.32 | ◎ |
| 10 | 1.2 | 0.015 | 0.26 | 1.27 | 0.10 | 0.011 | 0.006 | 0.005 | 0.008 | 0.05 | 0.01 | 9 | 1.9 | 70 | 38 | 0.38 | ◎ |
| 11 | 1.2 | 0.035 | 0.62 | 0.85 | 0.02 | 0.011 | 0.007 | 0.005 | 0.008 | 0.05 | 0.04 | 5 | 1.2 | 72 | 35 | 0.42 | ◎ |
| 12 | 1.2 | 0.030 | 0.58 | 1.55 | 0.07 | 0.009 | 0.005 | 0.082 | 0.010 | 0.05 | 0.01 | 2 | 1.7 | 15 | 0.4 | 0.12 | ○ |
| 13 | 1.2 | 0.030 | 0.52 | 1.48 | 0.05 | 0.009 | 0.005 | 0.005 | 0.019 | 0.05 | 0.01 | 3 | 0.8 | 7 | 0.2 | 0.01 | ○ |
| 14 | 1.2 | 0.030 | 0.52 | 1.48 | 0.05 | 0.009 | 0.005 | 0.004 | 0.012 | 0.23 | 0.02 | 5 | 0.7 | 80 | 51 | 0.82 | ○ |
| 15 | 1.2 | 0.066 | 0.53 | 1.32 | 0.15 | 0.015 | 0.003 | 0.010 | 0.010 | 0.50 | 0.02 | 3 | 0.5 | 5 | 0.4 | 0.005 | △ |
| Ex. | | | | | | | | | | | | | | | | | |
| 16 | 1.6 | 0.030 | 0.52 | 1.48 | 0.05 | 0.009 | 0.005 | 0.004 | 0.012 | 0.23 | 0.02 | 5 | 0.7 | 80 | 51 | 0.82 | ○ |
| 17 | 1.6 | 0.066 | 0.53 | 1.32 | 0.15 | 0.015 | 0.003 | 0.010 | 0.010 | 0.50 | 0.02 | 3 | 0.5 | 5 | 0.4 | 0.005 | △ |
| 18 | 1.6 | 0.067 | 0.53 | 1.33 | 0.14 | 0.016 | 0.003 | 0.010 | 0.010 | 0.05 | 0.01 | 3 | 0.8 | 15 | 0.3 | 0.15 | ○ |
| 19 | 1.6 | 0.067 | 0.53 | 1.33 | 0.14 | 0.016 | 0.003 | 0.010 | 0.010 | 0.05 | 0.01 | 3 | 0.8 | 22 | 0.6 | 0.21 | ◎ |
| 20 | 1.6 | 0.067 | 0.53 | 1.33 | 0.14 | 0.016 | 0.003 | 0.010 | 0.010 | 0.5 | 0.01 | 3 | 0.8 | 75 | 49 | 0.48 | ◎ |
| 21 | 1.6 | 0.067 | 0.53 | 1.33 | 0.14 | 0.016 | 0.003 | 0.010 | 0.010 | 0.05 | 0.01 | 3 | 0.8 | 95 | 58 | 0.62 | ○ |

TABLE 2

| No. | Wire diameter (mm φ) | Wire composition (mass %) | | | | | | | | | |
|---|---|---|---|---|---|---|---|---|---|---|---|
| | | C | Si | Mn | Ti | S | O | Cu | P | Mo | Zr |
| Ex. | | | | | | | | | | | |
| 22 | 1.2 | 0.005 | 0.36 | 158 | 0.14 | 0.010 | 0.003 | 0.005 | 0.009 | 0.10 | 0.01 |
| 23 | 1.2 | 0.170 | 0.41 | 1.75 | 0.15 | 0.010 | 0.004 | 0.005 | 0.003 | 0.10 | 0.01 |
| 24 | 1.2 | 0.087 | 0.14 | 0.68 | 0.17 | 0.009 | 0.007 | 0.03 | 0.006 | 0.15 | 0.005 |
| 25 | 1.2 | 0.085 | 1.4 | 0.80 | 0.18 | 0.008 | 0.005 | 0.02 | 0.01 | 0.06 | 0.005 |
| 26 | 1.2 | 0.07 | 0.35 | 0.39 | 0.19 | 0.008 | 0.005 | 0.003 | 0.015 | 0.05 | 0.01 |
| 27 | 1.2 | 0.081 | 0.49 | 2.70 | 0.18 | 0.01 | 0.003 | 0.004 | 0.016 | 0.05 | 0.01 |
| 28 | 1.2 | 0.07 | 0.71 | 1.92 | 0.01 | 0.01 | 0.006 | 0.004 | 0.02 | 0.1 | 0.01 |
| 29 | 1.2 | 0.07 | 0.71 | 1.92 | 0.01 | 0.01 | 0.006 | 0.004 | 0.02 | 0.1 | 0.01 |
| 30 | 1.2 | 0.07 | 0.71 | 1.92 | 0.03 | 0.01 | 0.006 | 0.004 | 0.02 | 0.1 | 0.01 |
| 31 | 1.2 | 0.07 | 0.71 | 1.92 | 0.03 | 0.01 | 0.006 | 0.004 | 0.02 | 0.1 | 0.01 |
| 32 | 1.2 | 0.07 | 0.69 | 1.50 | 0.32 | 0.012 | 0.012 | 0.01 | 0.023 | 0.09 | 0.01 |
| 33 | 1.2 | 0.062 | 0.68 | 1.63 | 0.04 | 0.0007 | 0.015 | 0.01 | 0.01 | 0.08 | 0.02 |
| 34 | 1.2 | 0.061 | 0.65 | 1.66 | 0.05 | 0.032 | 0.005 | 0.01 | 0.013 | 0.05 | 0.005 |
| 35 | 1.2 | 0.08 | 0.3 | 1.72 | 0.05 | 0.004 | 0.0005 | 0.004 | 0.012 | 0.05 | 0.01 |
| 36 | 1.2 | 0.112 | 0.35 | 1.43 | 0.1 | 0.01 | 0.025 | 0.004 | 0.02 | 0.04 | 0.01 |
| 37 | 1.2 | 0.105 | 0.42 | 1.42 | 0.05 | 0.015 | 0.005 | 0.08 | 0.024 | 0.12 | 0.01 |
| 38 | 1.2 | 0.032 | 0.9 | 2.10 | 0.06 | 0.016 | 0.006 | 0.005 | 0.0008 | 0.19 | 0.02 |
| 39 | 1.2 | 0.03 | 0.92 | 2.40 | 0.09 | 0.019 | 0.007 | 0.01 | 0.035 | 0.25 | 0.02 |
| 40 | 1.2 | 0.044 | 0.9 | 1.55 | 0.03 | 0.022 | 0.003 | 0.006 | 0.01 | 0.002 | 0.05 |
| 41 | 1.2 | 0.03 | 1.1 | 0.80 | 0.02 | 0.027 | 0.004 | 0.006 | 0.015 | 0.8 | 0.05 |
| 42 | 1.2 | 0.04 | 1.02 | 1.34 | 0.05 | 0.021 | 0.005 | 0.006 | 0.011 | 0.05 | 0.01 |
| 43 | 1.2 | 0.04 | 0.96 | 1.65 | 0.05 | 0.01 | 0.005 | 0.006 | 0.01 | 0.05 | 0.01 |

| No. | K (Mass PPM) | Poly-isobutene-containing oil (g/10 kg) | Number of dents | Effective pit length ratio (%) | MoS2 (g/10 kg) | Spatter evaluation |
|---|---|---|---|---|---|---|
| Ex. | | | | | | |
| 22 | 5 | 0.7 | 90 | 42 | 0.30 | ○ |
| 23 | 5 | 0.7 | 81 | 48 | 0.40 | ○ |
| 24 | 7 | 0.8 | 12 | 0.7 | 0.09 | ○ |
| 25 | 7 | 0.8 | 11 | 0.7 | 0.08 | ○ |
| 26 | 8 | 1 | 8 | 0.6 | 0.05 | ○ |
| 27 | 3 | 1 | 7 | 0.6 | 0.05 | ○ |
| 28 | 5 | 1 | 5 | 0.1 | 0.12 | ○ |
| 29 | 5 | 1 | 21 | 0.8 | 0.21 | ◎ |

TABLE 2-continued

| | | | | | | |
|---|---|---|---|---|---|---|
| 30 | 5 | 1 | 60 | 41 | 0.32 | ⊚ |
| 31 | 5 | 1 | 103 | 59 | 0.51 | ○ |
| 32 | 5 | 1.7 | 18 | 0.3 | 0.17 | ○ |
| 33 | 6 | 1.8 | 38 | 5 | 0.23 | ○ |
| 34 | 3 | 0.3 | 40 | 10 | 0.25 | ○ |
| 35 | 2 | 0.2 | 35 | 14 | 0.28 | ○ |
| 36 | 4 | 0.8 | 44 | 18 | 0.28 | ○ |
| 37 | 8 | 0.7 | 17 | 0.5 | 0.15 | Δ |
| 38 | 8 | 1.5 | 15 | 0.6 | 0.17 | ○ |
| 39 | 8 | 1.5 | 67 | 48 | 0.36 | ○ |
| 40 | 5 | 0.9 | 61 | 42 | 0.32 | ○ |
| 41 | 3 | 1 | 73 | 46 | 0.40 | ○ |
| 42 | 1.5 | 0.8 | — | — | 0.30 | Δ |
| 43 | 15 | 1.7 | — | — | 0.23 | Δ |

TABLE 3

| No. | Wire diameter (mm φ) | Wire composition (mass %) | | | | | | | | | | K (Mass PPM) | Poly-isobutene-containing oil (g/10 kg) | Number of dents | Effective pit length ratio (%) | MoS2 (g/10 kg) | Spatter evaluation |
|---|---|---|---|---|---|---|---|---|---|---|---|---|---|---|---|---|---|
| | | C | Si | Mn | Ti | S | O | Cu | P | Mo | Zr | | | | | | |
| Comp. Ex. | | | | | | | | | | | | | | | | | |
| 44 | 1.2 | 0.007 | 0.7 | 1.15 | 0.05 | 0.011 | 0.005 | 0.004 | 0.01 | 0.05 | 0.01 | 4 | None | — | — | 0.13 | X |
| 45 | 1.2 | 0.035 | 0.12 | 1.52 | 0.05 | 0.011 | 0.005 | 0.004 | 0.01 | 0.05 | 0.05 | 4 | None | — | — | 0.17 | X |
| 46 | 1.2 | 0.035 | 0.55 | 0.55 | 0.06 | 0.011 | 0.012 | 0.005 | 0.01 | 0.05 | 0.02 | 4 | None | — | — | 0.10 | X |
| 47 | 1.2 | 0.033 | 0.54 | 1.63 | 0.11 | 0.033 | 0.008 | 0.005 | 0.01 | 0.1 | 0.01 | 3 | None | — | — | 0.26 | X |
| 48 | 1.2 | 0.033 | 0.72 | 0.88 | 0.16 | 0.018 | 0.026 | 0.006 | 0.025 | 0.1 | 0.01 | 5 | None | — | — | 0.20 | X |
| 49 | 1.2 | 0.061 | 0.72 | 0.98 | 0.12 | 0.008 | 0.016 | 0.004 | 0.006 | 0.05 | 0.01 | 0 | None | — | — | 0.12 | XX |
| 50 | 1.2 | 0.05 | 0.67 | 1.22 | 0.06 | 0.011 | 0.01 | 0.004 | 0.009 | 0.05 | 0.05 | 15 | 0.08 | — | — | 0.20 | XX |
| 51 | 1.2 | 0.178 | 0.82 | 1.43 | 0.06 | 0.011 | 0.01 | 0.005 | 0.011 | 0.5 | 0.05 | 8 | None | — | — | 0.22 | XX |
| 52 | 1.2 | 0.072 | 1.08 | 1.40 | 0.03 | 0.016 | 0.015 | 0.005 | 0.01 | 0.05 | 0.02 | 5 | 2.1 | — | — | 0.44 | XX |
| 53 | 1.2 | 0.044 | 0.65 | 1.90 | 0.2 | 0.012 | 0.005 | 0.004 | 0.01 | 0.05 | 0.01 | 2 | None | — | — | 0.25 | XX |
| 54 | 1.2 | 0.04 | 0.32 | 1.23 | 0.27 | 0.006 | 0.01 | 0.005 | 0.012 | 0.01 | 0.01 | 7 | 0.09 | — | — | 0.65 | XX |

TABLE 4

| No. | Wire diameter (mm φ) | Wire composition (mass %) | | | | | | | | | | K (Mass PPM) | Poly-isobutene-containing oil (g/10 kg) | Number of dents | Effective pit length ratio (%) | MoS2 (g/10 kg) | Spatter evaluation |
|---|---|---|---|---|---|---|---|---|---|---|---|---|---|---|---|---|---|
| | | C | Si | Mn | Ti | S | O | Cu | P | Mo | Zr | | | | | | |
| Ex. | | | | | | | | | | | | | | | | | |
| 55 | 0.8 | 0.032 | 0.74 | 1.30 | 0.04 | 0.012 | 0.005 | 0.004 | 0.013 | 0.04 | 0.01 | tr. | 0.1 | 35 | 3 | 0.21 | ○ |
| 56 | 0.8 | 0.065 | 0.78 | 1.38 | 0.06 | 0.011 | 0.004 | 0.005 | 0.016 | 0.04 | 0.01 | 5 | 0.6 | 12 | 0.3 | 0.15 | ○ |
| 57 | 0.8 | 0.065 | 0.78 | 1.38 | 0.07 | 0.011 | 0.005 | 0.006 | 0.016 | 0.03 | 0.01 | tr. | 0.7 | 19 | 0.5 | 0.11 | ○ |
| 58 | 0.8 | 0.065 | 0.78 | 1.38 | 0.06 | 0.011 | 0.005 | 0.005 | 0.016 | 0.04 | 0.01 | 5 | 0.4 | 32 | 3 | 0.20 | ⊚ |
| 59 | 0.8 | 0.065 | 0.78 | 1.38 | 0.05 | 0.011 | 0.005 | 0.006 | 0.016 | 0.04 | 0.01 | tr. | 0.7 | 64 | 51 | 0.33 | ○ |
| 60 | 0.8 | 0.065 | 0.78 | 1.38 | 0.04 | 0.011 | 0.005 | 0.005 | 0.016 | 0.04 | 0.01 | 5 | 0.6 | 72 | 52 | 0.54 | ○ |
| 61 | 0.8 | 0.046 | 0.53 | 1.49 | 0.17 | 0.010 | 0.008 | 0.004 | 0.014 | 0.04 | 0.06 | tr. | 0.9 | 18 | 0.1 | 0.09 | ○ |
| 62 | 0.8 | 0.040 | 0.57 | 1.35 | 0.24 | 0.012 | 0.008 | 0.004 | 0.014 | 0.09 | 0.01 | 3 | 1.1 | 21 | 15 | 0.19 | ⊚ |
| 63 | 0.8 | 0.040 | 0.57 | 1.38 | 0.06 | 0.025 | 0.011 | 0.004 | 0.009 | 0.08 | 0.06 | tr. | 0.5 | 62 | 21 | 0.35 | ○ |
| 64 | 0.8 | 0.040 | 0.36 | 1.37 | 0.11 | 0.011 | 0.005 | 0.005 | 0.009 | 0.06 | 0.01 | 9 | 1.8 | 71 | 39 | 0.35 | ⊚ |
| 65 | 0.9 | 0.045 | 0.72 | 0.95 | 0.03 | 0.011 | 0.006 | 0.004 | 0.009 | 0.04 | 0.04 | 5 | 1.3 | 75 | 35 | 0.43 | ⊚ |
| 66 | 0.9 | 0.040 | 0.68 | 1.45 | 0.08 | 0.009 | 0.004 | 0.072 | 0.011 | 0.06 | 0.01 | tr. | 1.6 | 19 | 0.4 | 0.11 | ○ |
| 67 | 0.9 | 0.040 | 0.62 | 1.38 | 0.07 | 0.009 | 0.004 | 0.005 | 0.018 | 0.06 | 0.01 | tr. | 0.9 | 9 | 0.2 | 0.02 | ○ |
| 68 | 0.9 | 0.040 | 0.62 | 1.38 | 0.07 | 0.009 | 0.004 | 0.005 | 0.013 | 0.21 | 0.03 | 6 | 0.8 | 81 | 52 | 0.80 | ○ |
| 69 | 0.9 | 0.056 | 0.63 | 1.42 | 0.14 | 0.015 | 0.002 | 0.011 | 0.011 | 0.48 | 0.02 | tr. | 0.6 | 6 | 0.4 | 0.009 | Δ |
| 70 | 0.9 | 0.057 | 0.63 | 1.43 | 0.15 | 0.016 | 0.003 | 0.011 | 0.011 | 0.06 | 0.01 | 3 | 0.9 | 15 | 0.3 | 0.14 | ⊚ |
| 71 | 0.9 | 0.057 | 0.63 | 1.43 | 0.15 | 0.016 | 0.003 | 0.012 | 0.011 | 0.06 | 0.01 | tr. | 0.9 | 22 | 0.6 | 0.23 | ○ |
| 72 | 0.9 | 0.057 | 0.63 | 1.43 | 0.15 | 0.016 | 0.003 | 0.011 | 0.011 | 0.06 | 0.01 | 3 | 0.5 | 75 | 48 | 0.44 | ⊚ |
| 73 | 0.9 | 0.057 | 0.63 | 1.43 | 0.15 | 0.016 | 0.003 | 0.012 | 0.011 | 0.06 | 0.01 | tr. | 0.7 | 95 | 47 | 0.60 | ○ |
| 74 | 0.9 | 0.015 | 0.46 | 1.48 | 0.16 | 0.010 | 0.003 | 0.005 | 0.009 | 0.11 | 0.01 | 5 | 0.8 | 90 | 41 | 0.31 | ⊚ |
| 75 | 0.9 | 0.150 | 0.41 | 1.65 | 0.17 | 0.010 | 0.004 | 0.005 | 0.003 | 0.12 | 0.01 | 15 | 0.9 | 81 | 45 | 0.41 | Δ |

TABLE 5

| No. | Wire diameter (mm φ) | Wire composition (mass %) | | | | | | | | | | K (Mass PPM) | Poly-isobutene-containing oil (g/10 kg) | Number of dents | Effective pit length ratio (%) | MoS2 (g/10 kg) | Spatter evaluation |
|---|---|---|---|---|---|---|---|---|---|---|---|---|---|---|---|---|---|
| | | C | Si | Mn | Ti | S | O | Cu | P | Mo | Zr | | | | | | |
| Comp. Ex. | | | | | | | | | | | | | | | | | |
| 76 | 0.8 | 0.008 | 0.60 | 1.14 | 0.05 | 0.011 | 0.005 | 0.004 | 0.01 | 0.05 | 0.01 | 4 | None | — | — | 0.12 | X |
| 77 | 0.8 | 0.036 | 0.11 | 1.51 | 0.05 | 0.011 | 0.005 | 0.004 | 0.01 | 0.05 | 0.05 | tr. | None | — | — | 0.16 | X |
| 78 | 0.8 | 0.037 | 0.56 | 0.50 | 0.06 | 0.011 | 0.012 | 0.005 | 0.01 | 0.05 | 0.02 | 4 | None | — | — | 0.11 | X |
| 79 | 0.8 | 0.035 | 0.55 | 1.60 | 0.11 | 0.033 | 0.008 | 0.005 | 0.01 | 0.1 | 0.01 | tr. | None | — | — | 0.2 | XX |
| 80 | 0.8 | 0.031 | 0.73 | 0.85 | 0.16 | 0.018 | 0.026 | 0.006 | 0.025 | 0.1 | 0.01 | 5 | None | — | — | 0.1 | XX |
| 81 | 0.8 | 0.065 | 0.73 | 0.95 | 0.13 | 0.008 | 0.016 | 0.004 | 0.006 | 0.05 | 0.01 | tr. | None | — | — | 0.1 | XX |
| 82 | 0.9 | 0.07 | 0.68 | 1.21 | 0.06 | 0.011 | 0.01 | 0.004 | 0.008 | 0.05 | 0.05 | tr. | 0.05 | — | — | 0.1 | X |
| 83 | 0.9 | 0.17 | 0.83 | 1.42 | 0.05 | 0.011 | 0.01 | 0.005 | 0.011 | 0.5 | 0.04 | 8 | None | — | — | 0.11 | X |
| 84 | 0.9 | 0.075 | 1.00 | 1.40 | 0.03 | 0.016 | 0.014 | 0.005 | 0.01 | 0.04 | 0.02 | 5 | 2.2 | — | — | 0.4 | X |
| 85 | 0.9 | 0.046 | 0.66 | 1.92 | 0.3 | 0.013 | 0.005 | 0.004 | 0.01 | 0.05 | 0.01 | 2 | None | — | — | 0.21 | X |
| 86 | 0.9 | 0.05 | 0.31 | 1.20 | 0.28 | 0.006 | 0.01 | 0.005 | 0.012 | 0.01 | 0.02 | 7 | 0.08 | — | — | 0.62 | XX |
| 87 | 0.9 | 0.06 | 1.01 | 1.31 | 0.05 | 0.02 | 0.005 | 0.006 | 0.011 | 0.05 | 0.01 | 1 | 0.05 | — | — | 0.2 | X |
| 88 | 0.9 | 0.04 | 0.95 | 1.65 | 0.05 | 0.01 | 0.005 | 0.006 | 0.01 | 0.05 | 0.01 | tr. | 2.5 | — | — | 0.21 | X |

TABLE 6

| | Wire Diameter (mm φ) | | | |
|---|---|---|---|---|
| Welding Conditions | 0.8 | 0.9 | 1.2 | 1.6 |
| Welding Current (A) | 110 | 150 | 260 | 450 |
| Wire Extension (mm) | 15 | 15 | 20 | 20 |
| Welding Method | Flat-position bead on (see FIG. 6) | | | |
| Test Sheet | SM490 | | | |
| Shielding gas composition | 80% Ar + 20% CO₂ | | | |
| Shielding gas flow rate | 25 (l/min) | | | |

TABLE 7

Spatter evaluation criteria

| Wire diameter (mm φ) | | Evaluation |
|---|---|---|
| 0.8 0.9 Amount of generated spatters | 1.2 1.6 Amount of generated spatters | |
| 0~400 (mg/min) | 0~600 (mg/min) | ⊙ |
| more than 400–700 (mg/min) | more than 600–1000 (mg/min) | ○ |
| more than 700–900 (mg/min) | more than 1000–2000 (mg/min) | Δ |
| more than 900–1200 (mg/min) | more than 1200–1600 (mg/min) | X |
| more than 1200 (mg/min) | more than 1600 (mg/min) | XX |

Tables 1, 2, and 4 show the examples of the present invention, while Tables 3 and 5 show the comparative examples. Incidentally, every MoS₂ herein adopted has a particle diameter of 0.1 to 10 μm. Whereas, the polyisobutene-containing oil herein used has a polyisobutene content of not less than 80%, and contains oiliness improving components such as an ester for enhancing the fluidity of the oil as the balance components.

First, Table 1 will be explained. The sample of Example No. 1 satisfies all the requirements in the present invention. However, the amount of C component is close to the upper limit, and the amount of generated spatters is small, but slightly poor. In any of the samples of Examples Nos. 2, 3, and 8, the number of pits is less than the lower limit defined in the present invention, and the amount of generated spatters is small, but slightly poor. As for the sample of Example No. 6, the number of the pits is not less than 20. However, since the effective pit length ratio exceeds 50%, the surface roughness is considered to be high, resulting in a degradation in wire feedablity. Accordingly, a slightly less effect of reducing the amount of spatters is observed. As for the samples of Examples Nos. 7, 12, and 13, the effective pit length ratio is less than the lower limit defined in the present invention, and the amount of generated spatters is small, but slightly poor. The samples of Examples Nos. 4, 5, 9, and 10 respectively satisfy all the requirements in the present invention, and in any case, the amount of generated spatters is sufficiently small. As for the sample of Example No. 14, the amount of MoS₂ and the effective pit length ratio of the pits depart from the upper limits defined in the present invention, and the amount of generated spatters is small, but slightly poor. As for the sample of Example No. 15, the amount of MoS₂ and the effective pit length ratio of the pits depart from the lower limits defined in the present invention, and the amount of generated spatters is small, but more poor.

Herein, Examples Nos. 2 to 6 show the experimental results of the wires manufactured so as to have various different numbers of pits and effective pit length ratios using the wires made of the same components. As for each of the samples of Examples Nos. 4 and 5, it is shown that the number of pits is not less than 20, and that the effect of reducing the amount of spatters is more excellent.

Subsequently, the Nos. 16 to 21 of Table 1 are the examples in each of which the wire diameter has been changed into 1.6 mm. As for each of the samples of Examples Nos. 16 and 21, the amount of MoS₂ and the effective pit length ratio of the pits depart from the upper limits defined in the present invention, and the amount of generated spatters is evaluated as "○: a little poor". As for the sample of Example No. 17, the amount of MoS₂ and the effective pit length ratio of the pits depart from their respective lower limits defined in the present invention, and the amount of generated spatters is evaluated as "Δ: a little good". The samples of Examples Nos. 19 and 20 satisfy all of claims, and in either case, the amount of generated spatters is found to be sufficiently small (⊙).

Table 2 shows the examples most of which contain the components defined in the present invention including optional components in amounts departing from their respective lower and upper limits. Incidentally, in any of the cases, the wire with a diameter of 1.2 mm is used. As for the sample of No. 29, the amount of Ti is the lower limit value defined in the present invention. The sample satisfies all the requirements in the present invention, and the amount of generated spatters is sufficiently small. As for the sample of No. 37, the amount of Cu exceeds the upper limit defined in the present invention. The amount of generated spatters is evaluated as "Δ: a little good". As for each sample of Nos. 42 and 43, the amount of K compound on the wire surface portion exceeds the range defined in the present invention. The amount of generated spatters is evaluated as "Δ: a little good". As for each of other samples in Table 2, the amount of generated spatters is evaluated as "○: a little poor".

Incidentally, all the data of the examples are obtained by using potassium borate as the K compound in all the examples. Potassium borate is a fine powdery solid, and it can be dispersed and mixed in a polyisobutene-containing oil with ease. However, it is considered that any compound produces the same effect on the arc stability so long as it is a K compound. Therefore, presumably, other K compounds having the same physical properties may also be acceptable.

On the other hand, as shown in Table 3, for each sample of Comparative Examples Nos. 44 to 48, the coating weight of the polyisobutene-containing oil departs from the range defined in the present invention. Accordingly, the feedability for "the plating-free wire" as in the present invention is not sufficient, so that the amount of generated spatters is evaluated as "X": a little bad". Presumably, insufficient feedablity increases the frequency of occurrences of the instantaneous short circuit, causing generation of spatters. As for each sample of Comparative Examples Nos. 49 and 50, the coating weight of the polyisobutene-containing oil departs from the range defined in the present invention. Further, the amount of K compound departs from the range defined in the present invention. Accordingly, both of the feedability and the arc stability are insufficient, so that the amount of generated spatters is evaluated as "XX": bad". Presumably, in particular, if the amount of K compound is large, the deposition of the K compound onto the conduit liner is caused, thereby also hindering the feedability. This increases the amount of generated spatters.

As for the sample of Comparative Example No. 51, the coating weight of the polyisobutene-containing oil is less than the lower limit defined in the present invention, and the content of the C component exceeds the upper limit defined in the present invention. Whereas, for the sample of Comparative Example No. 52, the coating weight of the polyisobutene-containing oil is more than the upper limit defined in the present invention. Further, for the sample of Comparative Example No. 53, the coating weight of the polyisobutene-containing oil is less than the lower limit defined in the present invention. Still further, for the sample of Comparative Example No. 54, the coating weight of the polyisobutene-containing oil is less than the lower limit defined in the present invention, and the coating weight of $MoS_2$ exceeds the upper limit defined in the present invention. In consequence, in any of these cases, the amount of generated spatters has been found to be "XX": bad". Incidentally, Table 3 shows the examples in all of which the experiments have been carried out by using wires with a diameter of 1.2 mm.

Table 4 shows the experimental results obtained by using wires with different diameters of 0.8 mm and 0.9 mm. The evaluation criteria for the amount of generated spatters are different from those for the cases of a diameter of not less than 1.2 mm as shown in Table 7. The results of Table 4 indicate as follows. Namely, when the wire diameter is smaller than 1.2 mm, it is possible to implement the effect of reducing the amount of spatters even if no K compound is present. This is due to the following fact. Even if spatters are generated due to a short circuit caused as a result of shrinkage of a hanging droplet at the tip of the wire, the amount of generated spatters is smaller in view of such an amount. Conversely, if K is present, fluctuation of an arc column is caused by the creeping-up of the arc generation point for a wire with a small diameter of 0.8 mm or 0.9 mm. This is undesirable in terms of welding operability.

On the other hand, as shown in Table 5, the data of Comparative Examples Nos. 76 to 88 are obtained in the cases of small-diameter wires having diameters of 0.8 mm and 0.9 mm, in each of which the coating weight of the polyisobutene-containing oil departs from the range defined in the present invention. In any of these examples, the feedability for the "plating-free wire" as the product of the present invention is not sufficient, and hence the amount of generated spatters is evaluated as "X: a little bad" or "XX: bad". It can be considered that insufficient feedability increases the frequency of occurrences of the instantaneous short circuit to generate spatters.

The foregoing invention has been described in terms of preferred embodiments. However, those skilled, in the art will recognize that many variations of such embodiments exist. Such variations are intended to be within the scope of the present invention and the appended claims.

The disclosures of the priority documents, Application No. 2002-121436, filed in Japan on Apr. 23, 2002, and Application No. 2001-252526, filed in Japan on Aug. 23, 2001, are incorporated by reference herein in their entireties.

What is claimed is:

1. A plating-free solid wire for MAG welding, comprising:

pits, said pits comprising at least one of pits each having an opening on the circumferential surface of the wire, and being wider inside than at the opening, and pits each having an opening on the circumferential surface of the wire, and having a partial inside not to be irradiated with an externally incoming light;

a sulfide present in at least one of a region inside each of the pits and a region on the wire surface; and an oil containing polyisobutene present in at least one of a region inside of each of the pits and a region on the wire surface, the oil containing polyisobutene being present in an amount of 0.1 to 2 g per 10 kg of wire, wherein the surface of the wire is non-plated.

2. The plating-free solid wire for MAG welding according to claim 1, wherein the number of said pits is not less than 20 spots on a circumference in the circumferential surface of the wire, and the length ratio of said pits is not less than 0.5% and less than 50%.

3. The plating-free solid wire for MAG welding according to claim 1, wherein a K compound is present in at least one of a region inside of some of said pits and a region on the wire surface, and said K compound is present in this case in an amount in terms of K of 2 to 10 mass ppm based on the total mass of the wire.

4. The plating-free solid wire for MAG welding according to claim 3, wherein said K compound is potassium borate.

5. The plating-free solid wire for MAG welding according to claim 1, wherein said sulfide is $MoS_2$ having a particle diameter of 0.1 to 10 μm, and the $MoS_2$ is present in an amount of 0.01 to 0.5 g per 10 kg of the wire.

6. The plating-free solid wire for MAG welding according to claim 1, the wire further comprising: C: 0.01 to 0.15 mass %, Si: 0.2 to 1.2 mass %, Mn: 0.5 to 2.5 mass %, P: 0.001 to 0.030 mass %, S: 0.001 to 0.030 mass %, and O: 0.001 to 0.020 mass %.

7. The plating-free solid wire for MAG welding according to claim 6, further comprising Cu in an amount of not more than 0.05 mass %.

8. The plating-free solid wire for MAG welding according to claim 6, further comprising Ti+Zr in an amount of 0.03 to 0.3 mass %.

9. The plating-free solid wire for MAG welding according to claim 8, further comprising Mo in an amount of 0.01 to 0.6 mass %.

* * * * *